United States Patent
Hsieh

(10) Patent No.: US 7,064,497 B1
(45) Date of Patent: Jun. 20, 2006

(54) DEAD-TIME-MODULATED SYNCHRONOUS PWM CONTROLLER FOR DIMMABLE CCFL ROYER INVERTER

(75) Inventor: Guan-Chyun Hsieh, Taipei (TW)

(73) Assignee: National Taiwan University of Science and Technology (TW)

( * ) Notice: Subject to any disclaimer, the term of this patent is extended or adjusted under 35 U.S.C. 154(b) by 0 days.

(21) Appl. No.: 11/055,003

(22) Filed: Feb. 9, 2005

(51) Int. Cl.
*H05B 41/16* (2006.01)

(52) U.S. Cl. .............. 315/246; 315/300; 315/DIG. 4

(58) Field of Classification Search ........... 315/209 R, 315/224, 246, 276, 283, 287, 291, 299, 300, 315/307, DIG. 4
See application file for complete search history.

(56) References Cited

U.S. PATENT DOCUMENTS

| | | | |
|---|---|---|---|
| 6,013,969 A * | 1/2000 | Noma et al. ............... | 310/318 |
| 6,864,643 B1 * | 3/2005 | Min et al. .................. | 315/246 |
| 2005/0093476 A1 * | 5/2005 | Gray ........................ | 315/224 |
| 2005/0243580 A1 * | 11/2005 | Lyle, Jr. .................... | 363/16 |

* cited by examiner

*Primary Examiner*—Thuy Vinh Tran

(57) ABSTRACT

A Synchronous PWM controller realized by dead-time modulation is provided for applying to the self-oscillation Royer inverter. The proposed dead-time-modulated PWM (DTM-PWM) controller is composed of a monostable circuit and a constant-current charger (CCC). The presented switching period for the buck regulation consists of a referred sawtooth having a constant-period and a dead-time. The synchronizing strategy is conducted by modulating the dead-time according to the resonant frequency of the Royer inverter. Two kinds of the control strategies in DTM-PWM controller are explored including the down-going and up-going error voltage controls. A DTM-PWM controlled dimmable Royer inverter with two-CCFL having primary-side control is designed and realized. Two kinds of the existing controllers for the Royer inverter are also experimented and compared with the proposed DTM-PWM controller. The results of the analysis and the theoretical prediction are verified with the experiments.

22 Claims, 19 Drawing Sheets

DEAD-TIME-MODULATED SYNCHRONOUS PWM CONTROLLER FOR DIMMABLE CCFL ROYER INVERTER

FIELD OF THE INVENTION

The present invention relates to a dead-time-modulated pulse width modulation (DTM-PWM) controller. More specifically, this invention relates to a DTM synchronous PWM controller for dimming a cold-cathode fluorescent lamp (CCFL) Royer inverter.

BACKGROUND OF THE INVENTION

Major difficulties in regulating the self-oscillating Royer inverters for driving a CCFL primarily stem from the synchronization problem. Nowadays, lots of synchronization control strategies have been developed for solving the regulation problems on Royer inverters. The general approach to achieve the synchronization is only by modulating the converter center frequency with some degree of variations.

A typical current-fed Royer inverter for CCFL 1 is shown in FIG. 1. In which, the current source is formed by a buck converter 12. Switches $S_1$ and $S_2$ are in self-oscillation with a resonant tank $C_R$ and $L_R$. The energy pump-up from the current-fed buck converter 12 is controlled by a PWM controller 11. Remarkably, the buck converter 12 may not pump enough energy for inverter in some control range because the center tap voltage $V_x$ of the transformer T1 as well as the buck output voltage is always in a quasi-sinusoidal form. It may result in the uncertainty of conduction in the buck converter 12 due to the resonant quasi-sinusoidal voltage $V_x$ could be higher than the input voltage $V_{dc}$. Besides, the way to regulate the Royer inverter should be to achieve the synchronization between the buck switch S3 and the resonant switches, S1 and S2, so as to increase the efficiency and reduce the EMI. The present invention presents a DTM-PWM controller to exactly achieve the synchronization of the self-oscillating Royer inverters. Appropriate analysis and experimentation are introduced to explore the DTM-PWM controller. The present invention provides an adequate start-up voltage and a quasi-sinusoidal current for driving the CCFL with relatively higher efficiency. This is relatively a simple and efficient approach to achieve a synchronous PWM controller for synchronizing the buck drives and the current-fed self-oscillating Royer inverter. The achievements of the present invention are verified with experiments.

Kept the drawbacks of the prior arts in mind, and employed experiments and research full-heartily and persistently, the dead-time-modulated synchronous PWM controller for the dimmable CCFL Royer inverter is finally conceived by the applicant.

SUMMARY OF THE INVENTION

It is therefore an object of the present invention to propose a synchronous DTM-PWM controller to provide energy pump-up to the Royer inverter for dimming the CCFLs. The proposed DTM-PWM controller can synchronously process the cycle-by-cycle control in the liner regulation with respect to the resonant frequency of the Royer inverter.

According to the aspect of the present invention, the controller for providing a DTM synchronous PWM to a dimmable CCFL Royer inverter, wherein a first and a second voltages are applied to the controller to generate an output voltage to control a switch for dimming the CCFL, includes: a constant current charger (CCC) for generating the first voltage, a first comparator for comparing the second voltage with a first reference voltage to generate a trigger signal, a second comparator electrically connected to the first comparator for comparing the trigger signal with a second reference voltage, a third comparator electrically connected to the CCC for comparing the first voltage with a third reference voltage, a flip-flop electrically connected to the second comparator and the third comparator for generating a control signal in response to the outputs of the second and the third comparators, a discharger having a first terminal for receiving the control signal, a second terminal electrically connected to the CCC, and a third terminal electrically connected to a ground, a fourth comparator electrically connected to the CCC for comparing an error signal with the first voltage to generate a down-going error voltage, and a fifth comparator electrically connected to the CCC for comparing the error signal with the first voltage to generate an up-going error voltage, wherein the output voltage is one of the down-going and the up-going voltages.

Preferably, the first voltage has a linear sawtooth waveform.

Preferably, the second voltage is a voltage from a center tap of a transformer.

Preferably, the voltage from the center tap of the transformer has a quasi-sinusoidal waveform.

Preferably, the output voltage is a PWM signal.

Preferably, the switch is a power switch of a buck converter for dimming the CCFL.

Preferably, the CCC is a linear charger.

Preferably, the linear charger includes a current source and a capacitor.

Preferably, the third reference voltage is a minimum level of voltage for re-initiating a charging of the capacitor of the CCC.

Preferably, the first voltage generated by the CCC initiates a charging of the capacitor at each negative-going transition of the trigger signal and ceases the charging when a voltage across the capacitor is equal to the second reference voltage, and then the capacitor discharges through the discharger rapidly.

Preferably, the first voltage is input to a non-inverting terminal of the first comparator, and the first reference voltage is input to an inverting terminal of the first comparator.

Preferably, the first reference voltage is one of a zero voltage and a preset threshold voltage.

Preferably, the second reference voltage is input to a non-inverting terminal of the second comparator, and the trigger signal is input to an inverting terminal of the second comparator.

Preferably, the flip-flop is an RS flip-flop.

Preferably, the discharger is a bi-polar junction transistor.

Preferably, the first, the second, and the third terminals are a base, a collector, and an emitter respectively.

Preferably, the first voltage is input to a non-inverting terminal of the fourth comparator, and the error signal is input to an inverting terminal of the fourth comparator.

Preferably, the error signal is input to a non-inverting terminal of the fifth comparator, and the first voltage is input to an inverting terminal of the fifth comparator.

Preferably, the error signal is generated from a primary-side charge-pump controller of the Royer inverter.

According to another aspect of the present invention, the controller for providing a DTM synchronous PWM to a dimmable CCFL Royer inverter, wherein a first and a second voltages are applied to the controller to generate an output voltage to control a switch for dimming the CCFL, includes: a CCC for generating the first voltage, a first comparator for comparing the first voltage with a first reference voltage to generate a trigger signal, a second comparator electrically connected to the first comparator for comparing the trigger signal with a second reference voltage, a third comparator electrically connected to the CCC for comparing the first voltage with a third reference voltage, a flip-flop electrically connected to the second comparator and the third comparator for generating a control signal in response to the outputs of the second and the third comparators, a discharger having a first terminal for receiving the control signal, a second terminal electrically connected to the CCC, and a third terminal electrically connected to a ground, and an output circuit electrically connected to the CCC for generating the output voltage in response to an error signal and the first voltage.

Preferably, the output circuit includes: a fourth comparator electrically connected to the CCC for comparing the error signal with the first voltage to generate a down-going error voltage, and a fifth comparator electrically connected to the CCC for comparing the error signal with the first voltage to generate an up-going error voltage, wherein the output voltage is one of the down-going and the up-going voltages.

The present invention may best be understood through the following descriptions with reference to the accompanying drawings, in which:

DETAILED DESCRIPTION OF THE PREFERRED EMBODIMENT

Figure 1:
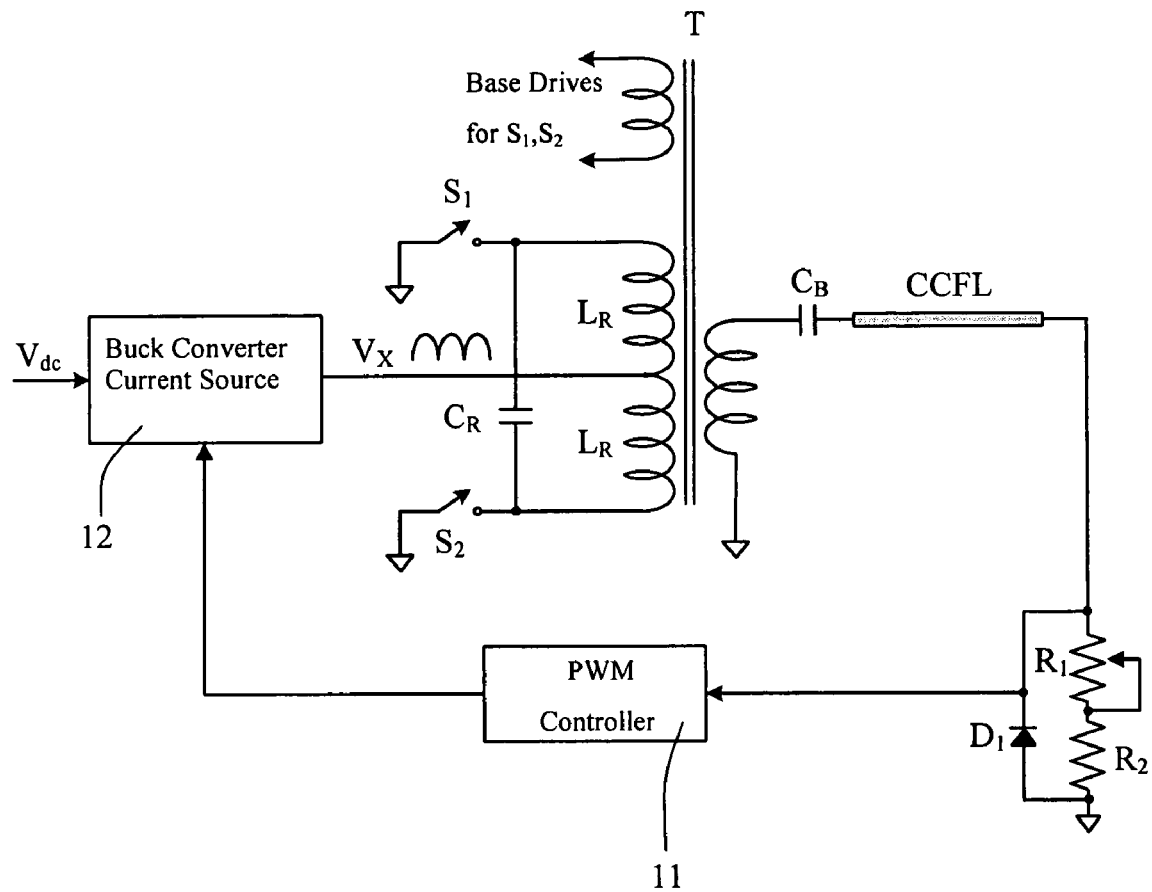
FIG. 1 is the schematic circuit diagram of the typical current-fed Royer inverter for CCFL in the prior art.
Figure 2:
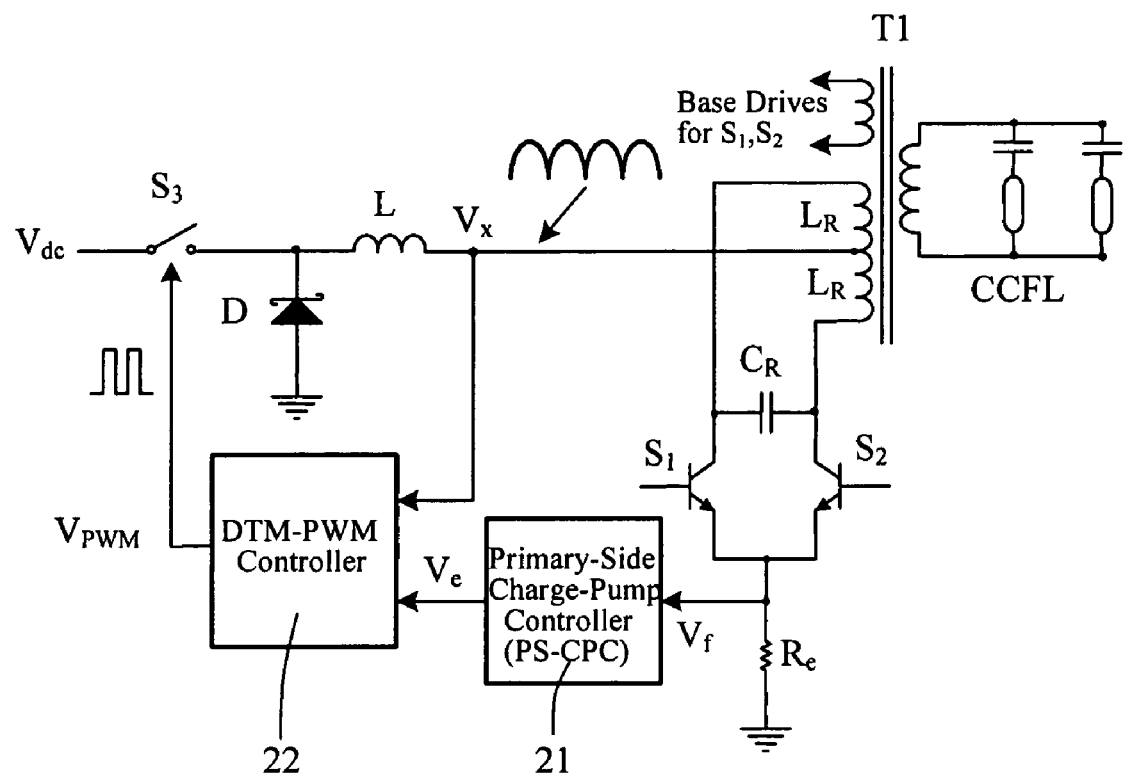
FIG. 2 is the schematic circuit diagram of the preferred embodiment of the DTM-PWM controlled current-fed Royer inverter of the present invention.

FIG. 2 shows the schematic circuit diagram of the DTM-PWM controlled Royer inverter 2 of the preferred embodiment of the present invention, in which the primary-side charge-pump controller (PS-CPC) 21 is included (G. C. Hsieh, "Eliminating thermostat effect and dimming ability purposed electronic ballast for CCFL driver system," ROC Patent No. 175770, 2003-2021).

Figure 3:
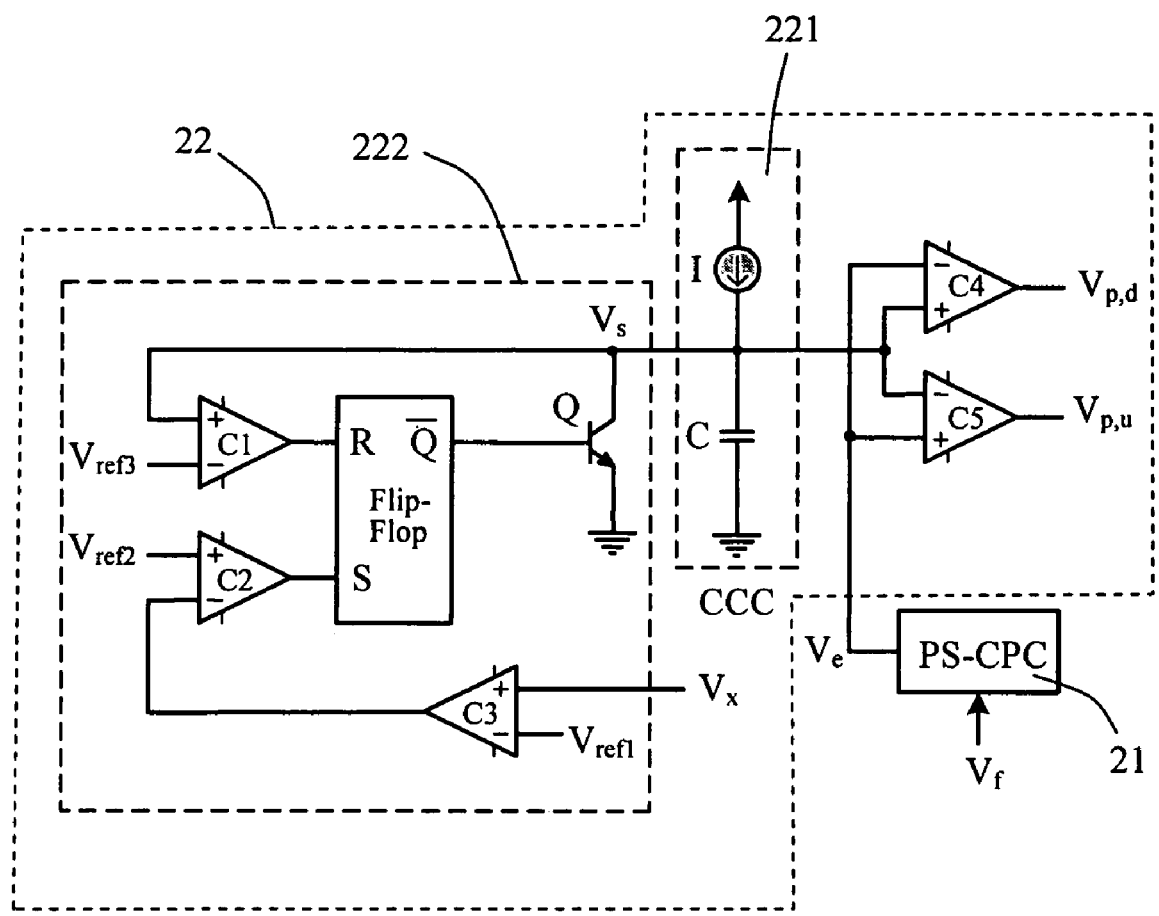
FIG. 3 is the schematic circuit diagram of the preferred embodiment of the DTM-PWM controller of the present invention.

The proposed DTM-PWM controller 22 is shown in FIG. 3, which primarily consists of a constant current charger (CCC) 221 and a monostable circuit 222. The CCC 221 having a current source I, and a capacitor C is a linear charger and is designed to produce a DTM sawtooth waveform $V_s$. The monostable circuit 222 is composed of two comparators (C1 and C2), one RS Flip-Flop, and a discharger Q. The comparator C3 is for the synchronization detection and provides a trigger signal $V_t$ for initiating the monostable circuit 222 when zero voltage or preset threshold voltage ($V_{ref1}$) is detected at the center tap voltage $V_x$ of the transformer T1. The comparators C4 and C5 are for DTM-PWM outputs. Their outputs are achieved by comparing the error signal $V_e$ from PS-CPC with the referred DTM sawtooth waveform $V_s$. Two kinds of the control strategies are explored in FIGS. 4(a) and 4(b). The output $V_{p,d}$ of C4 is for down-going error voltage control and the output $V_{p,u}$ of C5 is for up-going error voltage control, respectively. We define the down-going error voltage $V_{e,d}$ (up-going error voltage $V_{e,u}$) is inversely proportional to (proportional to) the amplitude of the sampled feedback signal $V_f$.

The trigger signals $V_t$s generated from C3 for the mentioned two kinds of control strategies are the same and can exactly synchronize with the detected resonant frequency at $V_x$. The clock for the two referred DTM sawtooth waveforms is started when the trigger pulse $V_t$ is in the negative-going transition. Accordingly, the clock time is exactly synchronous with the quasi-sinusoidal voltage detected at $V_x$. The linear sawtooth waveforms $V_s$ generated from CCC 221 initiates the charging of the capacitor C at each negative-going transition of $V_t$ and ceases the charging when a voltage across the capacitor C is equal to the reference voltage $V_{ref2}$ (usually, it is 3V), and then the capacitor C discharges through the discharger Q rapidly. The referred DTM sawtooth train for buck regulation has equal ramp amplitude including a pre-settable constant period $t_s$ in each cycle and is independent of the inverter resonant frequency variations. The reference voltage $V_{ref3}$ is a minimum level reference employed for re-initiating the charging of C in CCC 221.

Figure 4A:
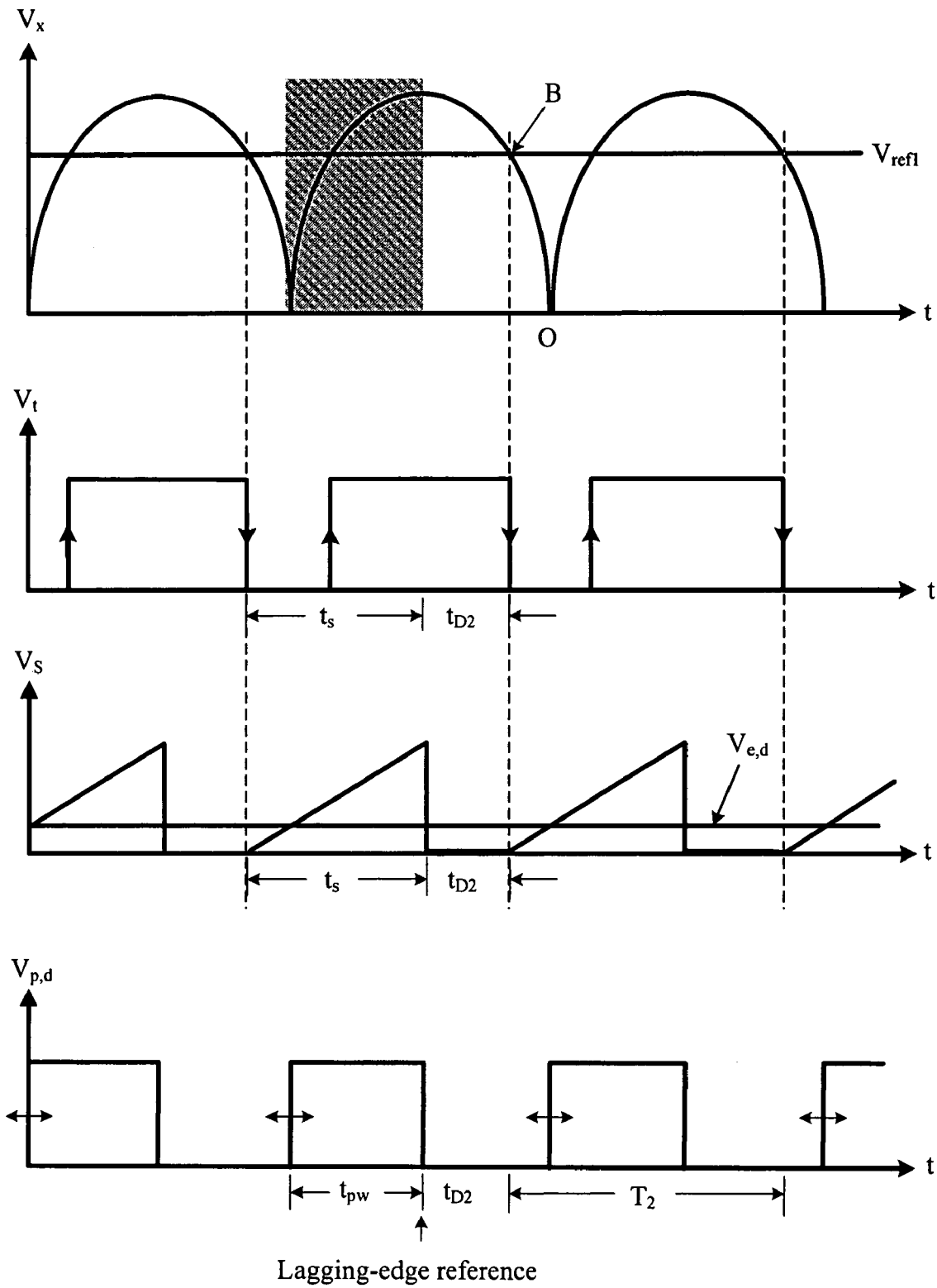
FIG. 4(a) shows the theoretical waveforms of the transformer center tap voltage $V_x$, the trigger signal $V_t$, the referred sawtooth $V_s$, and the output of the comparator C4, $V_{P,d}$, for down-going error voltage regulation by $V_{e,d}$ with heavy load of the preferred embodiment of the DTM-PWM controller for the Royer inverter of the present invention respectively.
Figure 4B:
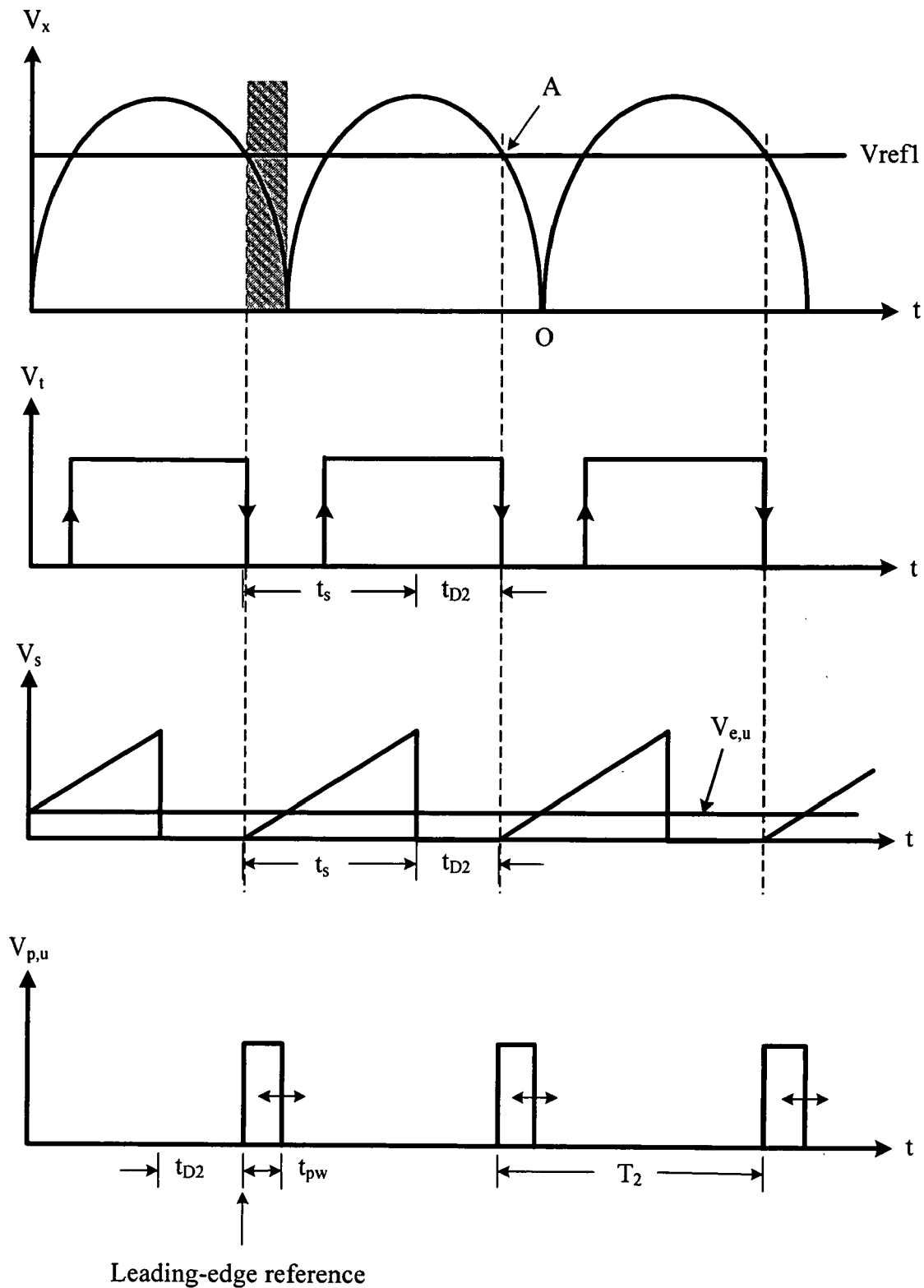
FIG. 4(b) shows the theoretical waveforms of the transformer center tap voltage $V_x$, the trigger signal $V_t$, the referred sawtooth $V_s$, and the output of the comparator C4, $V_{P,u}$, for up-going error voltage regulation by $V_{e,u}$ with light load of the preferred embodiment of the DTM-PWM controller for the Royer inverter of the present invention respectively.

Excluding $t_s$ in the resonant period T, a dead-time $t_D$ is designed to promptly vary according to the inverter resonant frequency so as to achieve the synchronization. Two kinds of output pulse trains, $V_{P,d}$ and $V_{P,u}$, as shown in FIGS. 4(a) and 4(b) are available at the outputs of C4 and C5 of the DTM-PWM controller 22. In FIG. 4(a) (FIG. 4(b)), the output pulse train with lagging-edge reference (leading-edge reference) is acquired when a down-going (up-going) error voltage $V_{e,d}$ ($V_{e,u}$) control strategy is adopted. Thus, the complete PWM period T generated from the DTM-PWM controller 22 essentially consists of a constant-period $t_s$ and a modulated dead-time $t_D$.

In the present invention, a primary-side DTM-PWM controlled dimmable Royer inverter for CCFL is examined. Regulations by down-going error voltage $V_{e,d}$ and up-going error voltage $V_{e,u}$ are respectively examined. FIG. 2 is the proposed schematic circuit diagram of the preferred embodiment of the present invention, in which both two transistors S1 and S2 operate in a self-resonant mode. The entire energy control for dimming the CCFL is regulated by a buck converter 22, which is formed by a power switch $S_3$, an inductor L, and a Schottky diode D. The feedback signal $V_f$ for system regulation is sampled at the emitter resistor $R_e$ of the two emitter-coupled transistors $S_1$ and $S_2$. A down-going (up-going) error voltage $V_e = V_{e,d}$ ($V_e = V_{e,u}$) is acquired through a primary-side charge-pump controller (PS-CPC) 21.

In FIG. 3, a trigger signal $V_t$ generated from C3 is realized by a detection of the quasi-sinusoidal voltage $V_x$ at the center tap of the transformer T1 through comparing with a preset reference $V_{ref1}$ (zero-voltage or a preset threshold voltage). A referred DTM sawtooth waveform $V_s$ is built through a logical operation of the monostable circuit 222 and CCC 221.

As shown in FIG. 4(a), a lagging-edge-referred DTM-PWM pulse train $V_{p,d}$ is generated by comparing $V_{e,d}$ with $V_s$. Alternately, in FIG. 4(b), a leading-edge-referred DTM-PWM pulse train $V_{p,u}$ is generated by comparing $V_{e,u}$ with $V_s$. For dimming the CCFL, the buck power switch $S_3$ (as shown in FIG. 2) is manipulated. Remarkably, shadows depicted on the two quasi-sinusoidal waveforms of $V_x$ as shown in FIGS. 4(a) and 4(b) are the possible conduction regions of S3 for buck regulation. There is a need for a pre-settable $V_{ref1}$ required in the DTM-PWM.

Figure 5A:
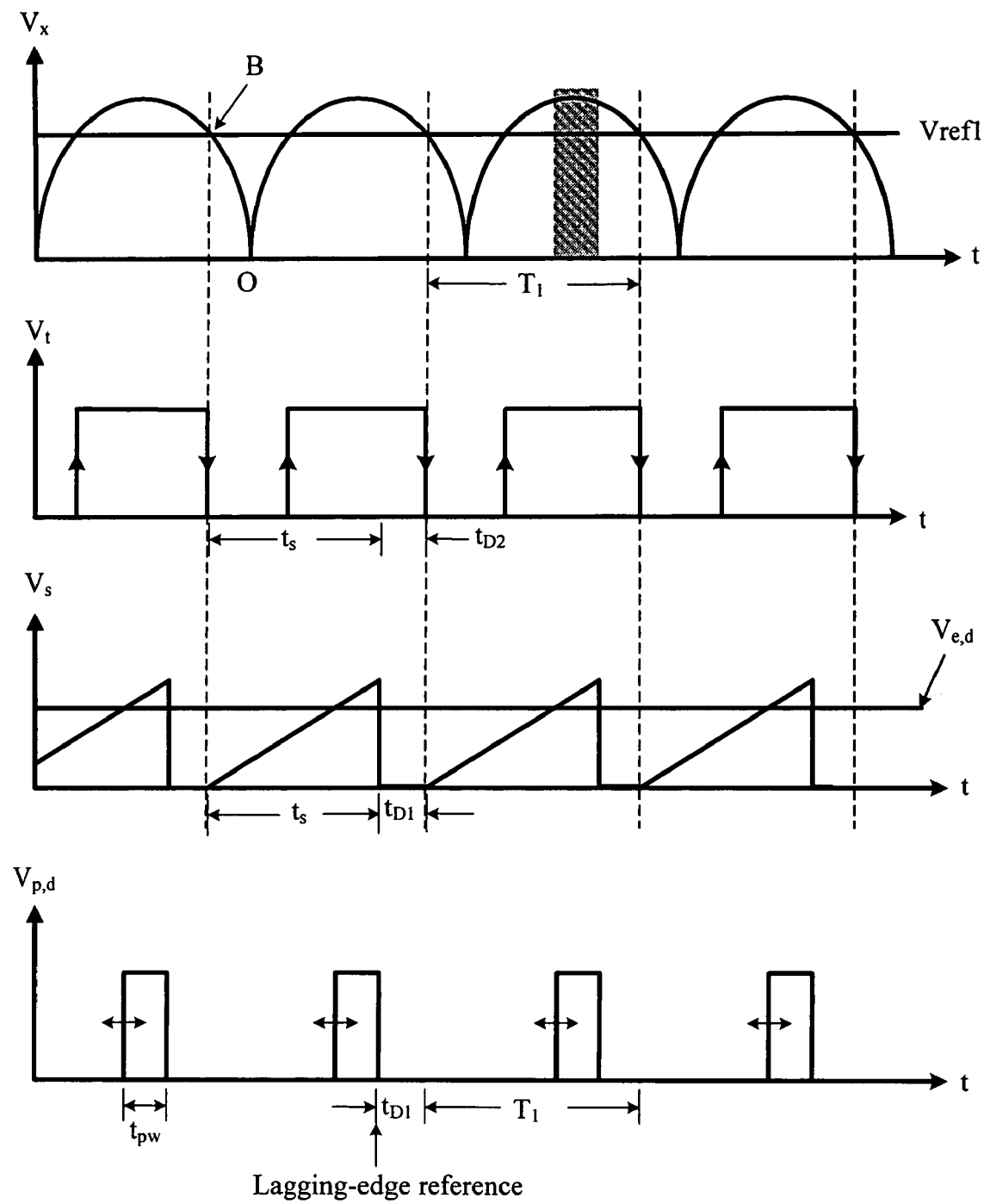
FIG. 5(a) shows the theoretical waveforms of the transformer center tap voltage $V_x$, the trigger signal $V_t$, the referred sawtooth $V_s$, and the output of the comparator C4, $V_{P,d}$, for down-going error voltage regulation by $V_{e,d}$ with light load of the preferred embodiment of the DTM-PWM controller for the Royer inverter of the present invention respectively.
Figure 5B:
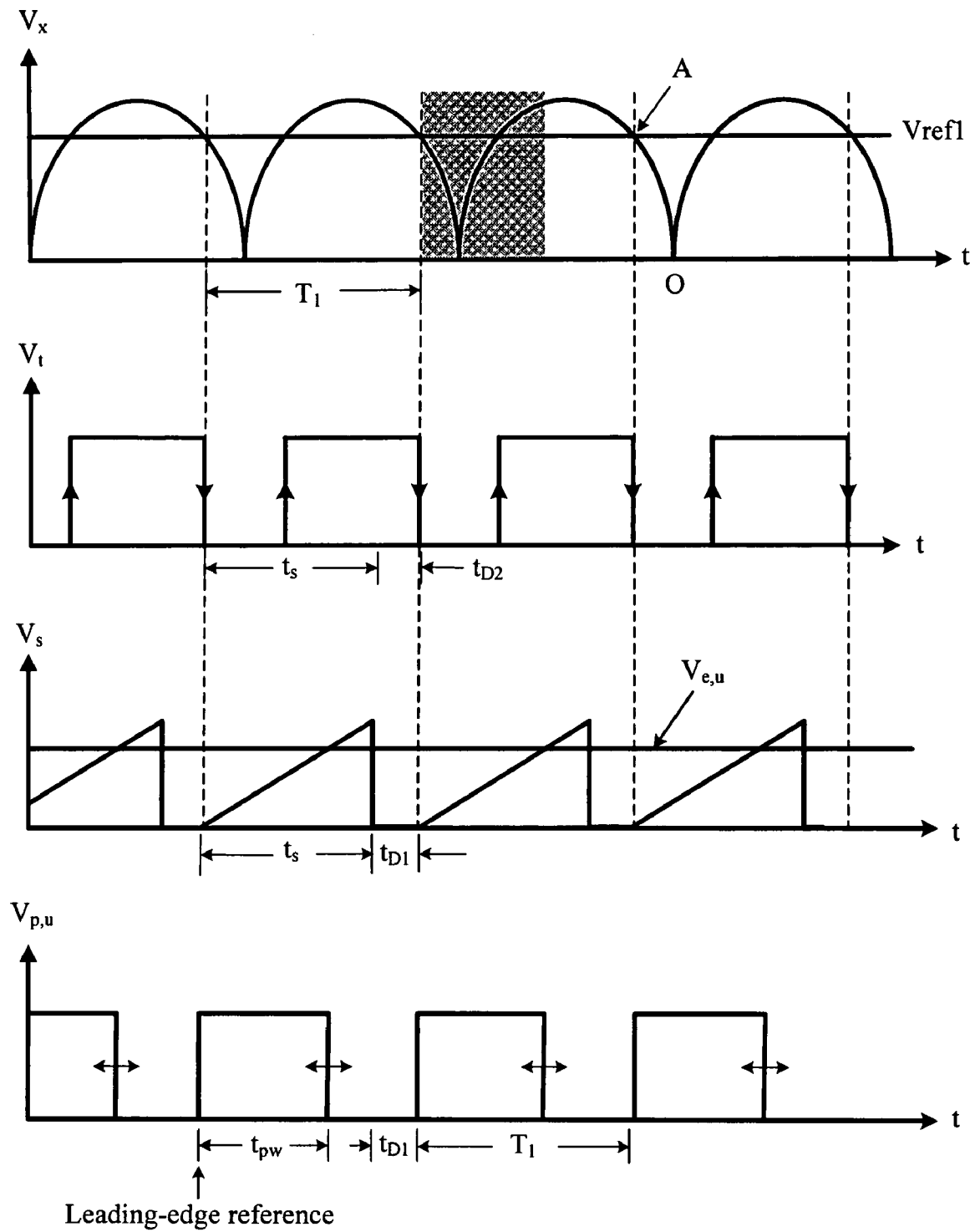
FIG. 5(b) shows the theoretical waveforms of the transformer center tap voltage $V_x$, the trigger signal $V_t$, the referred sawtooth $V_s$, and the output of the comparator C4, $V_{P,u}$, for up-going error voltage regulation by $V_{e,u}$ with heavy load of the preferred embodiment of the DTM-PWM controller for the Royer inverter of the present invention respectively.

For clarifying the mentioned two control strategies, the alternate control statuses are also shown in FIGS. 5(a) and 5(b) for the comparison. Two kinds of the control strategies for light load (lower luminance), in FIGS. 4(b) and 5(a); for heavy load (full luminance), in FIGS. 4(a) and 5(b), are predicted and clearly depicted, respectively. Remarkably, the sawtooth trains $V_s$ in both two strategies for light and heavy loads are always equal in ramp rate and duty period $t_s$. Only the dead-time $t_D$ is dependent on the load variation. In light load (heavy load) condition of FIGS. 4(b) and 5(a) (FIGS. 4(a) and 5(b)), the DTM-PWM controller 22 synchronously works with a high (low) resonant frequency $f_1$ ($f_2$) of the Royer inverter 2 and produces a small (large) dead-time $t_{D1}$ ($t_{D2}$) in the switching period $T_1$ ($T_2$). The proposed pulse train $V_{P,d}$ or $V_{P,u}$ can synchronously provides the Royer inverter 2 for a wider linear regulation with lower power dissipation on the buck power switch S3 relatively.

Design Considerations

The peak amplitude of the linear sawtooth voltage $V_s$ can be chosen as the general case of $V_{s,p}$=3V in practice. From FIGS. 4 and 5, it is easily found that the resonant frequency of the Royer inverter 2 is high (low) for light (heavy) load condition relatively. For assuring that the Royer inverter 2 can be kept through cycle-by-cycle control at minimum load condition during the dimming process and still sustained the synchronization, the minimum dead-time $t_{D,min}$ is then chosen by considering the power requirements of the Royer inverter 2 and also should be defined within 10%–20% of the half-period of the maximum resonant frequency $f_{r,max}$, i.e., $$t_{D,min} = k \cdot \frac{T_{r,min}}{2} \quad (1)$$

Where $T_{r,min}=1/f_{r,max}$ and k=0.1–0.2. Thus, the desired constant duty period $t_s$ of the reference sawtooth is then estimated by $$t_s = \frac{T_{r,min}}{2} - t_{D,min} \quad (2)$$

Remarkably, the reference sawtooth period $t_s$ should be a constant and independent of the variation of the inverter resonant frequency during dimming process. Also, the maximum dead-time $t_{D,max}$ can be estimated when the Royer inverter 2 is in the state of full luminance (at heavy load condition), where the resonant frequency is the minimum $f_{r,min}$, that is, $$t_{D,max} = \frac{T_{r,max}}{2} - t_s \quad (3)$$

Where $T_{r,max}=1/f_{r,min}$. With the specified $f_{r,max}$ of the inverter resonant tank (at light load condition) and the estimated period $t_s$ of the reference sawtooth, the capacitor C in CCC 221 of FIG. 3 can then be obtained by $$C = \frac{It_s}{V_{s,p}} \quad (4)$$

Where I is a constant current and $V_{s,p}$ is the peak amplitude of the reference sawtooth.

Realization and Experiment

A DTM-PWM controlled dimmable Royer inverter with two-CCFL having primary-side control is designed and realized. The schematic circuit diagrams of Royer inverter 2 and the DTM-PWM controller 22 are shown in FIGS. 2 and 3, respectively, in which two CCFLs are in parallel (in 490 mm-long each). The characteristics of each CCFL specified at full luminance include nominal lamp power 5 W, lamp voltage 1 $kV_{rms}$, lamp current 5 mA, and starting voltage 1.5 $kV_{rms}$, etc. The Royer inverter 2 is driven by an input voltage of 12$V_{DC}$ and has a nominal resonant frequency of 50 kHz at the full luminance of 10 W-output. Thus, the minimum switching frequency $f_{b,min}$ for the buck converter is given by $f_{b,min}=2f_r=100$ kHz. We specify the resonant frequency $f_r$ of the Royer inverter 2 for the load variation being varied from 50 kHz for heavy load (about 10 W-output) to 60 kHz for light load (about 2 W-output).

Figure 6A:
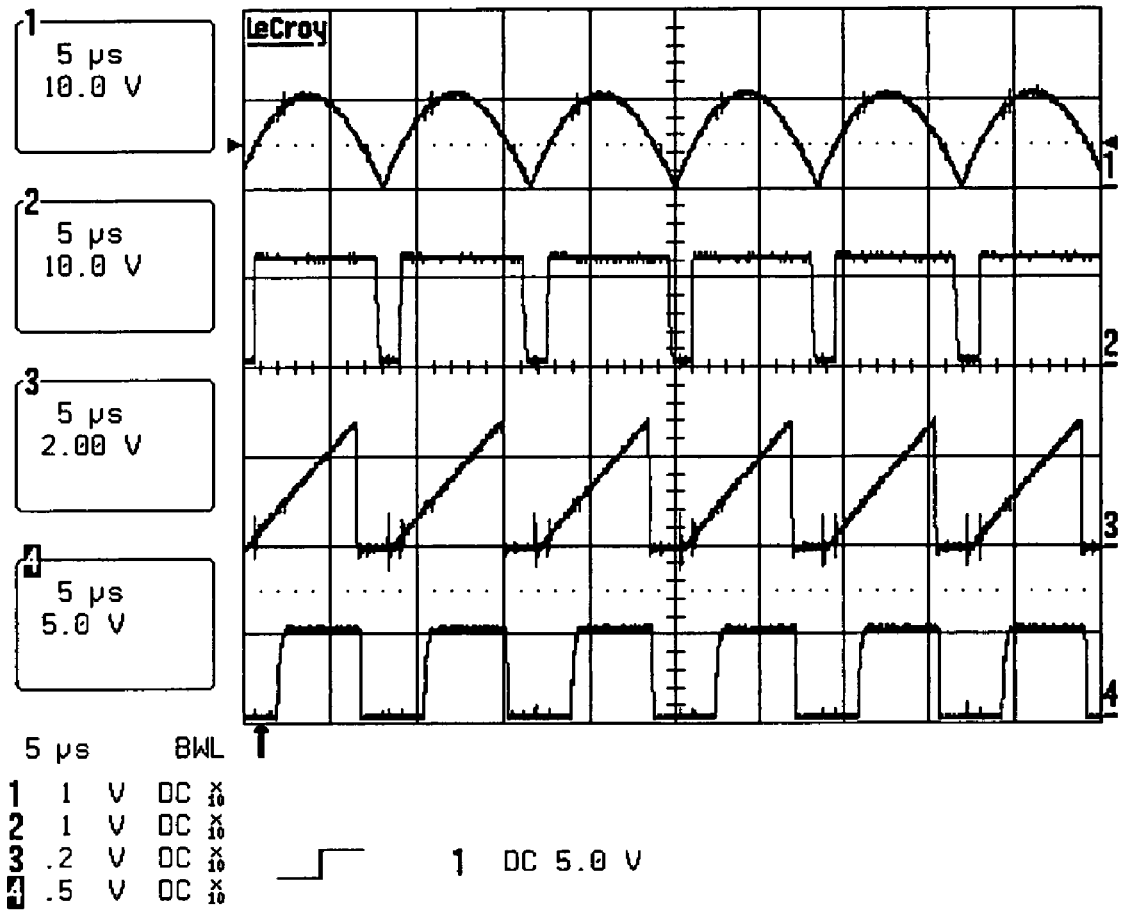
FIG. 6(a) shows the experimental waveforms of the transformer center tap voltage $V_x$, the trigger signal $V_t$, the referred sawtooth $V_s$, and the output of the comparator C4, $V_{P,d}$, for down-going error voltage regulation by $V_{e,d}$ of the preferred embodiment of the DTM-PWM controller for the Royer inverter of the present invention respectively, in which $V_{in}=12 V_{dc}$, $I_{in}=0.2$ A, $f_r=117.5$ kHz, and a light load of 2 W-output is employed.
Figure 6B:
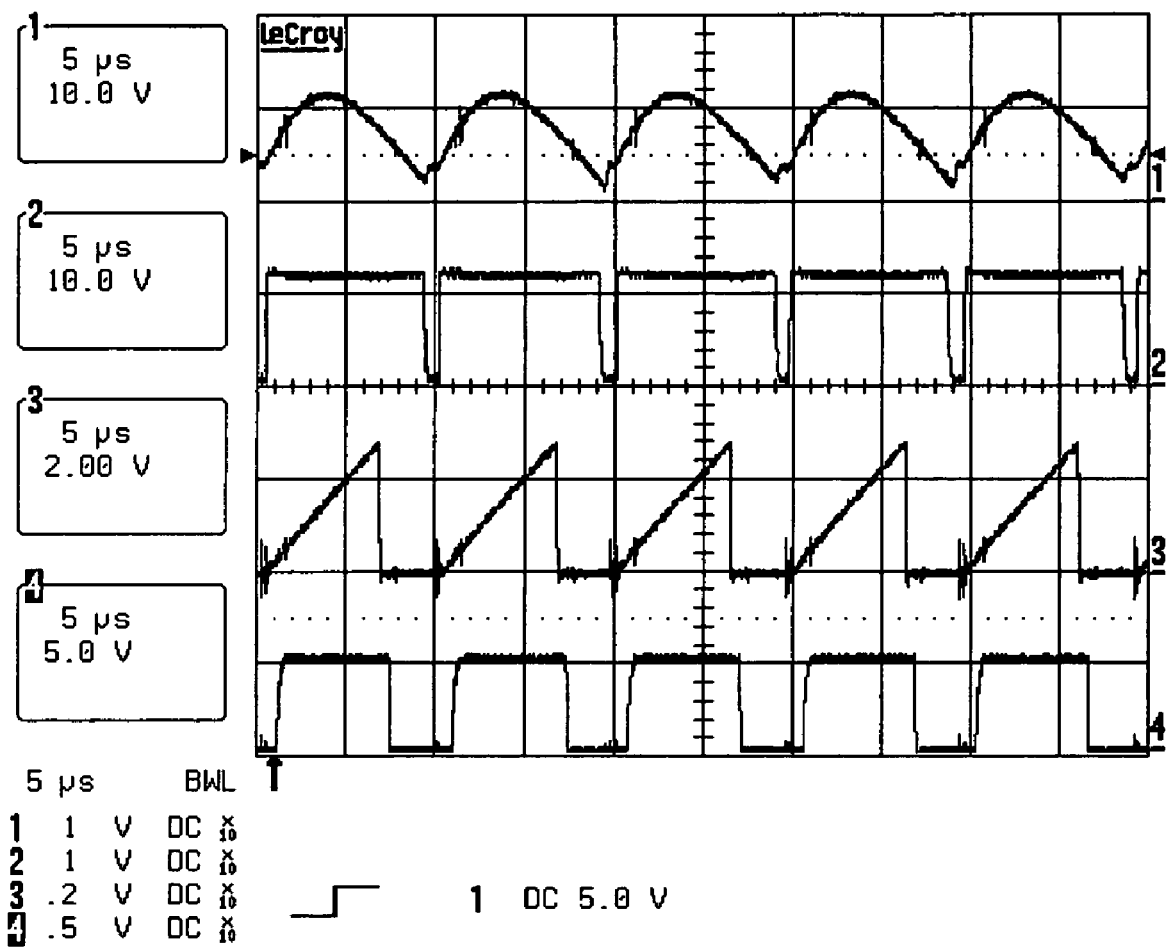
FIG. 6(b) shows the experimental waveforms of the transformer center tap voltage $V_x$, the trigger signal $V_t$, the referred sawtooth $V_s$, and the output of the comparator C4, $V_{P,u}$, for up-going error voltage regulation by $V_{e,d}$ of the preferred embodiment of the DTM-PWM controller for the Royer inverter of the present invention respectively, in which $V_{in}=12V_{dc}$, $I_{in}=0.88$ A, $f_r=101.7$ kHz, and a heavy load of 10 W-output is employed.

Thus, the synchronous frequencies for buck regulation would be set from $f_{b,min}=100$ kHz for heavy load to $f_{b,max}=120$ kHz for light load, respectively. Through (1)–(4) by specifying k=0.2 for light load condition, we yield $t_s=6.67$ µs, $t_{D,min}=1.67$ µs at light load of 2 W-output, and $t_{D,max}=3.33$ µs at heavy load of 10 W-output. The charging capacitor is then given by C=2.13 nF with $V_{s,p}=3$V and the constant current I=960 µA. The experimental results for heavy load of 10 W-output and light load of 2 W-output are respectively measured in FIGS. 6(a) and 6(b) for down-going error control strategy with $V_{ref1}=0$V. It is clearly seen that the frequency of the output pulse train from the DTM-PWM controller 22 is exactly equal to two times the inverter resonant frequency. The synchronization procedure for buck regulation closely tracks the half-period of the inverter resonant frequency during the wide-range regulation from 101.6 kHz for the heavy load to 117.5 kHz for the light load. Remarkably, the reference sawtooth's period is always kept at a constant of $t_s=6.7$ µs and is independent of the variations of the inverter resonant frequency. Besides, during the synchronization procedure, the dead-time $t_D$ varies from 1.8 µs for light load to 3.13 µs for heavy load. The overall efficiency of the Royer inverter 2 with the DTM-PWM control strategy is up to 92% at the full luminance. The experimental results are quite close to the predictions.

Figure 7A:
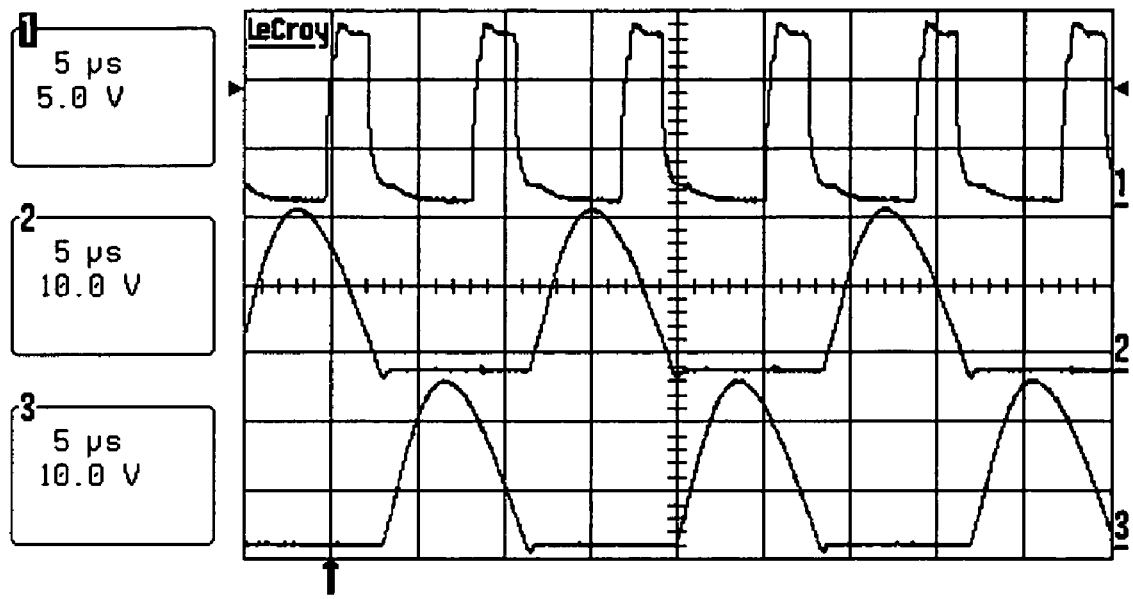
FIG. 7(a) shows the experimental waveforms of the gate drive pulses, and the quasi-sinusoidal waveforms on the two transistors' collectors of the traditional Royer inverter including a typical controller of synchronization respectively.
Figure 7B:
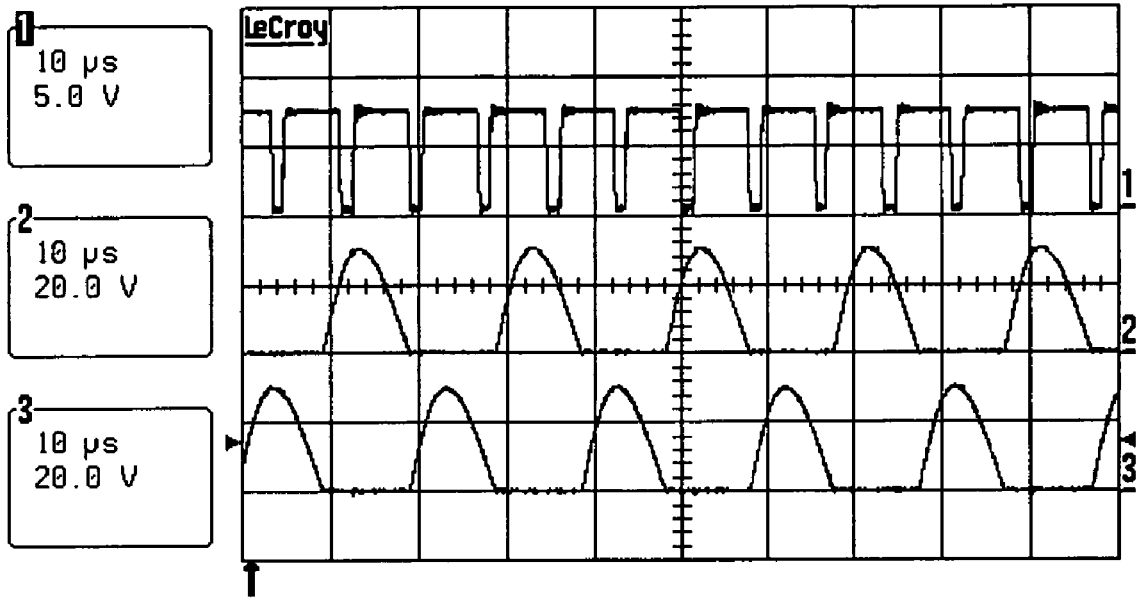
FIG. 7(b) shows the experimental waveforms of the gate drive pulses, and the quasi-sinusoidal waveforms on the two transistors' collectors of a Royer inverter including an IC controller of non-synchronization respectively.

For clarifying the contributions of the DTM-PWM controller 22, two kinds of the existing controllers for the Royer inverters are also experimented for the comparisons. The gate drive pulses, which are capable of achieving the synchronization for the buck regulation, and the quasi-sinusoidal waveforms on the two transistors' collectors of the traditional Royer inverter including a typical controller of synchronization are shown in FIG. 7(a). But, it could not pump enough energy for the relatively high power output while driving multiple of CCFLs. Furthermore, the inverter efficiency in this control is relatively low due to the narrow and limited conduction range for S3 and the nonlinear buck regulation. FIG. 7(b) is for an IC controller of the Royer inverter. The gate drive pulse for the buck regulation is in linear control but the gate frequency does not synchronize with the resonant frequency of the Royer inverter. It may result in the energy pump uncertainty problem for the buck switch S3. And also, it may produce more EMI noises and more power dissipations on the buck converter.

Figure 8A:
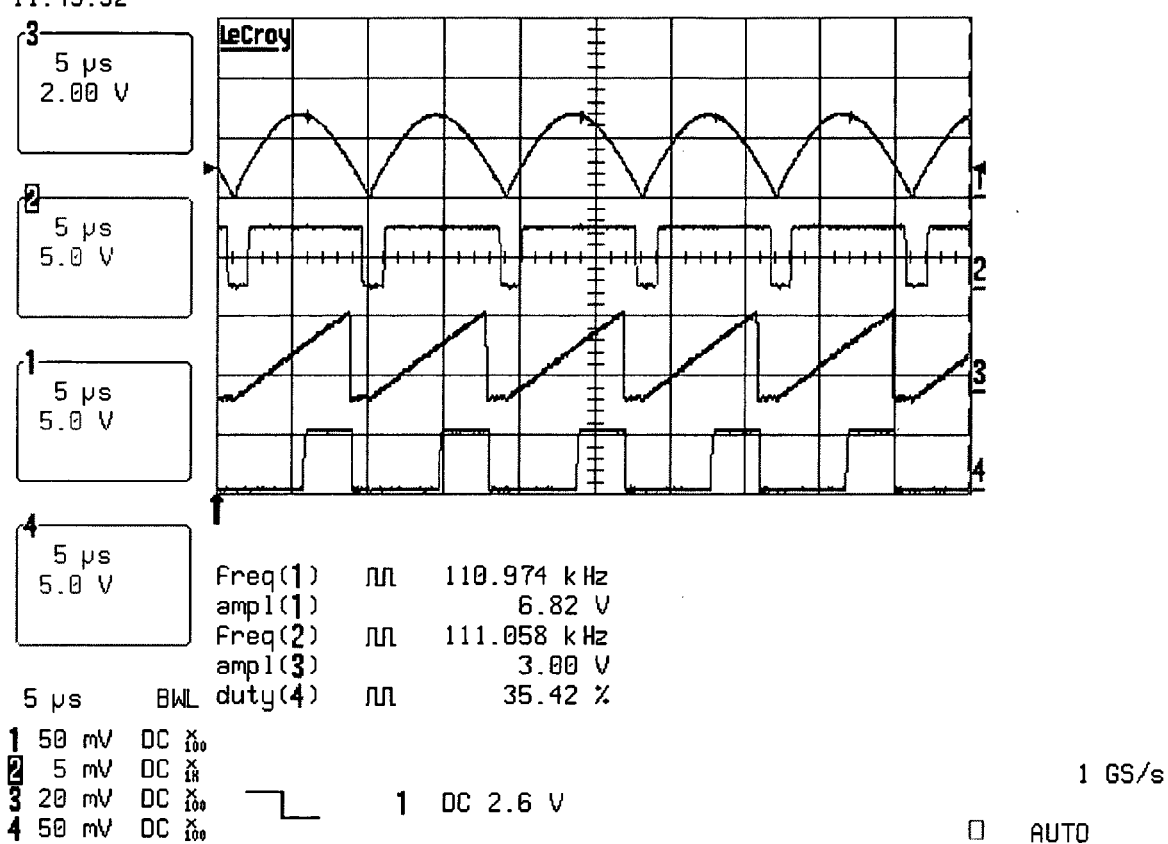
FIG. 8(a) shows the experimental waveforms of the transformer center tap voltage $V_x$, the trigger signal $V_t$, the referred sawtooth $V_s$, and the output of the DTM-PWM controller, $V_{PWM}$, with down-going error voltage regulation by $V_{e,d}$ employed, zero voltage detected at $V_{ref1}$, and a relatively lower illumination of the preferred embodiment of the DTM-PWM controller for the Royer inverter of the present invention respectively.
Figure 8B:
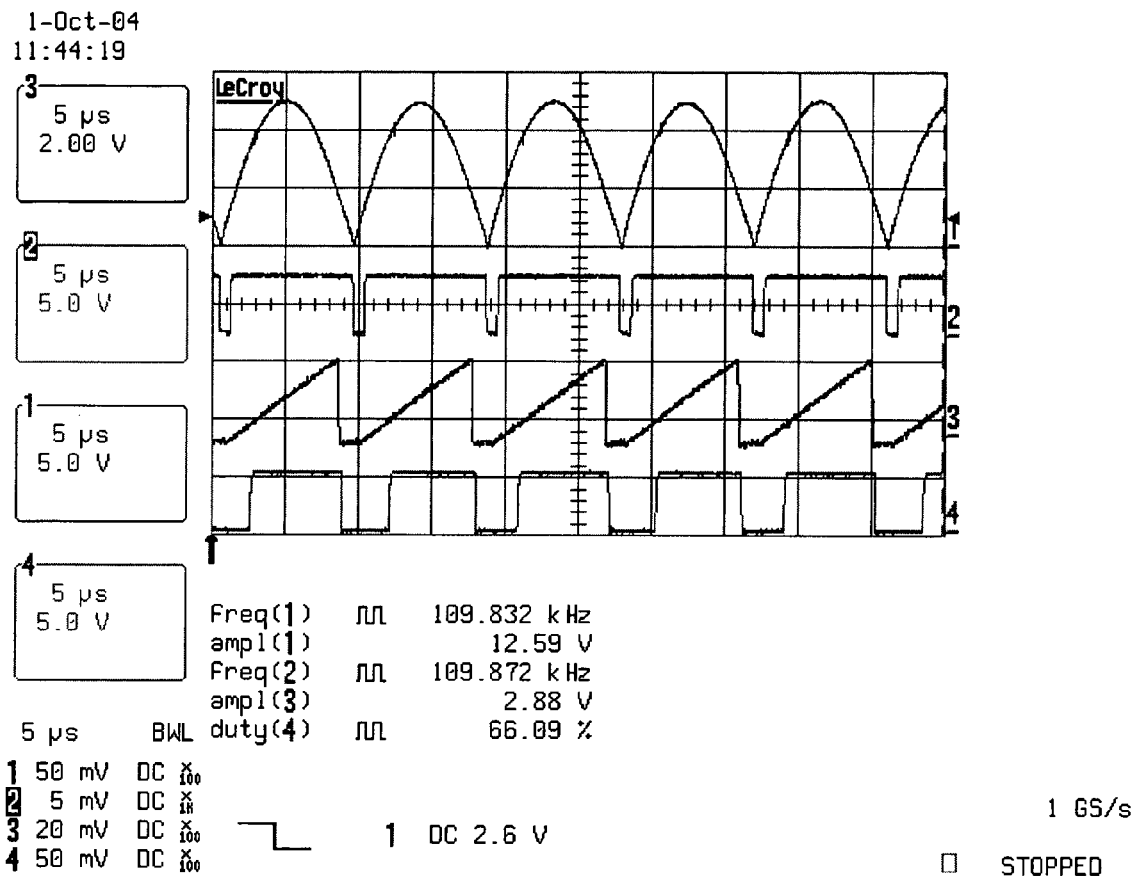
FIG. 8(b) shows the experimental waveforms of the transformer center tap voltage $V_x$, the trigger signal $V_t$, the referred sawtooth $V_s$, and the output of the DTM-PWM controller, $V_{PWM}$, with down-going error voltage regulation by $V_{e,d}$ employed, zero voltage detected at $V_{ref1}$, and a relatively higher illumination of the preferred embodiment of the DTM-PWM controller for the Royer inverter of the present invention respectively.
Figure 8C:
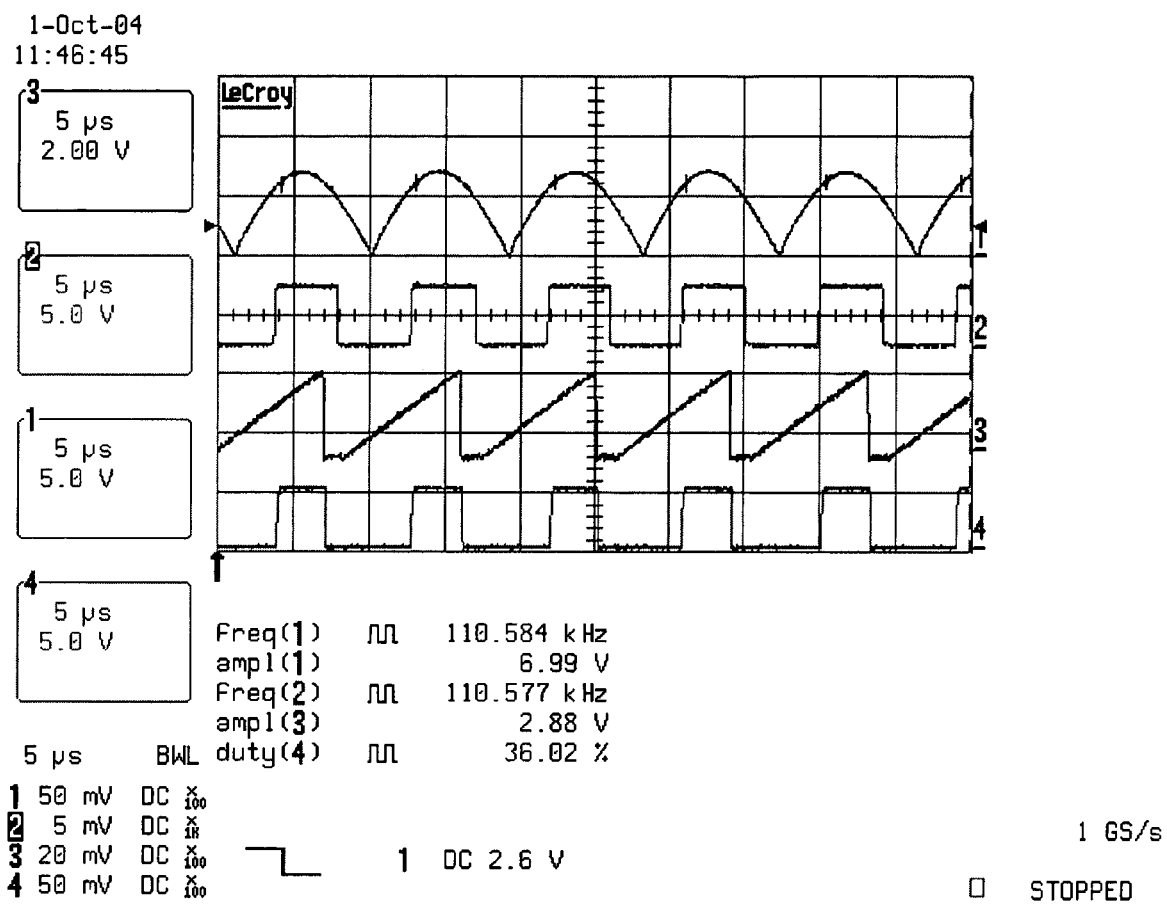
FIG. 8(c) shows the experimental waveforms of the transformer center tap voltage $V_x$, the trigger signal $V_t$, the referred sawtooth $V_s$, and the output of the DTM-PWM controller, $V_{PWM}$, with down-going error voltage regulation by $V_{e,d}$ employed, a preset threshold voltage detected at $V_{ref1}$, and a relatively lower illumination of the preferred embodiment of the DTM-PWM controller for the Royer inverter of the present invention respectively.
Figure 8D:
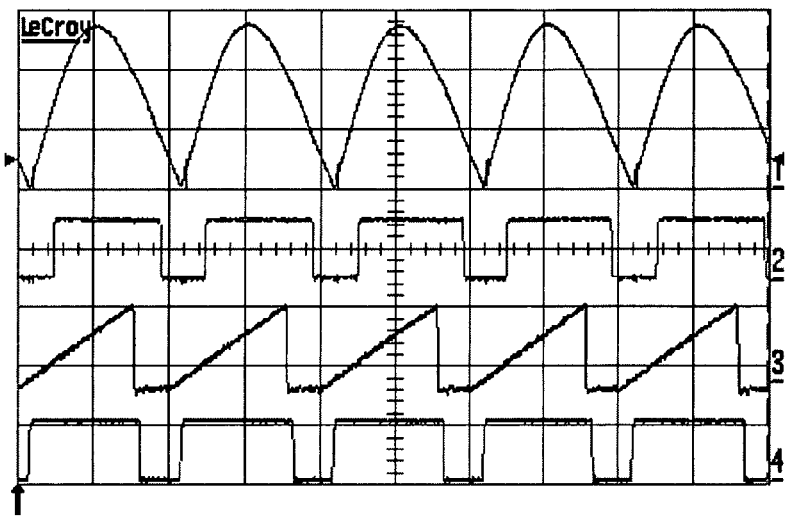
FIG. 8(d) shows the experimental waveforms of the transformer center tap voltage $V_x$, the trigger signal $V_t$, the referred sawtooth $V_s$, and the output of the DTM-PWM controller, $V_{PWM}$, with down-going error voltage regulation by $V_{e,d}$ employed, a preset threshold voltage detected at $V_{ref1}$, and a relatively higher illumination of the preferred embodiment of the DTM-PWM controller for the Royer inverter of the present invention respectively.
Figure 9A:
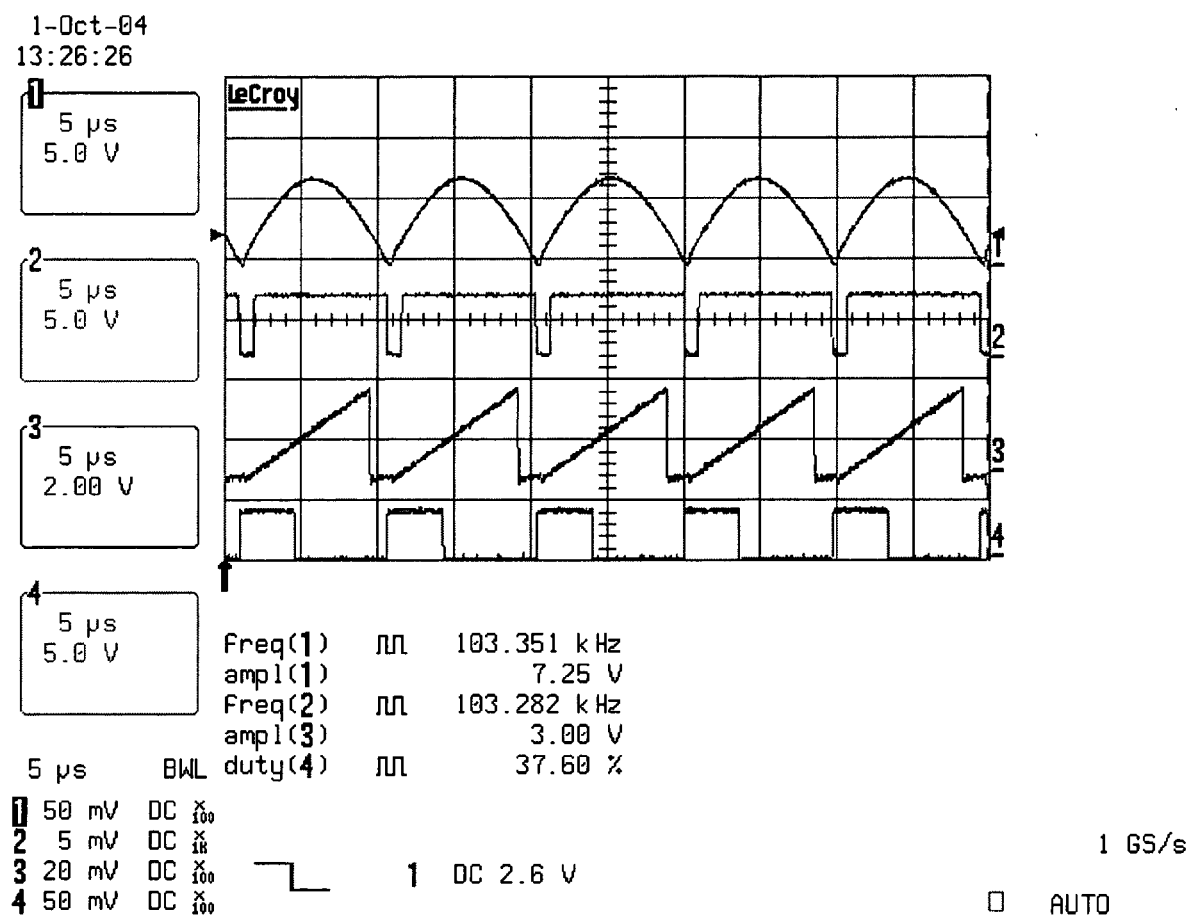
FIG. 9(a) shows the experimental waveforms of the transformer center tap voltage $V_x$, the trigger signal $V_t$, the referred sawtooth $V_8$, and the output of the DTM-PWM controller, $V_{PWM}$, with up-going error voltage regulation by $V_{e,d}$ employed, zero voltage detected at $V_x$, and a relatively lower illumination of the preferred embodiment of the DTM-PWM controller for the Royer inverter of the present invention respectively.
Figure 9B:
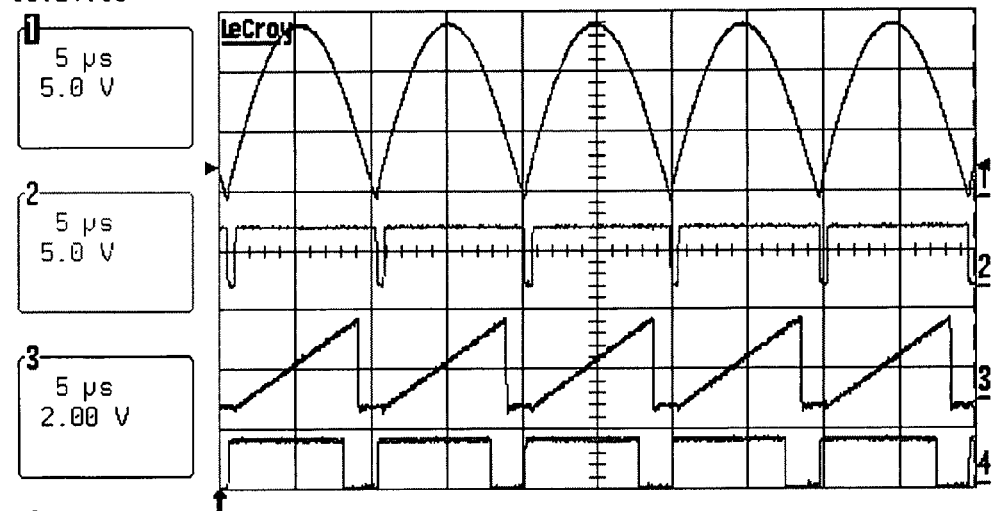
FIG. 9(b) shows the experimental waveforms of the transformer center tap voltage $V_x$, the trigger signal $V_t$, the referred sawtooth $V_s$, and the output of the DTM-PWM controller, $V_{PWM}$, with up-going error voltage regulation by $V_{e,d}$ employed, zero voltage detected at $V_x$, and a relatively higher illumination of the preferred embodiment of the DTM-PWM controller for the Royer inverter of the present invention respectively.
Figure 9C:
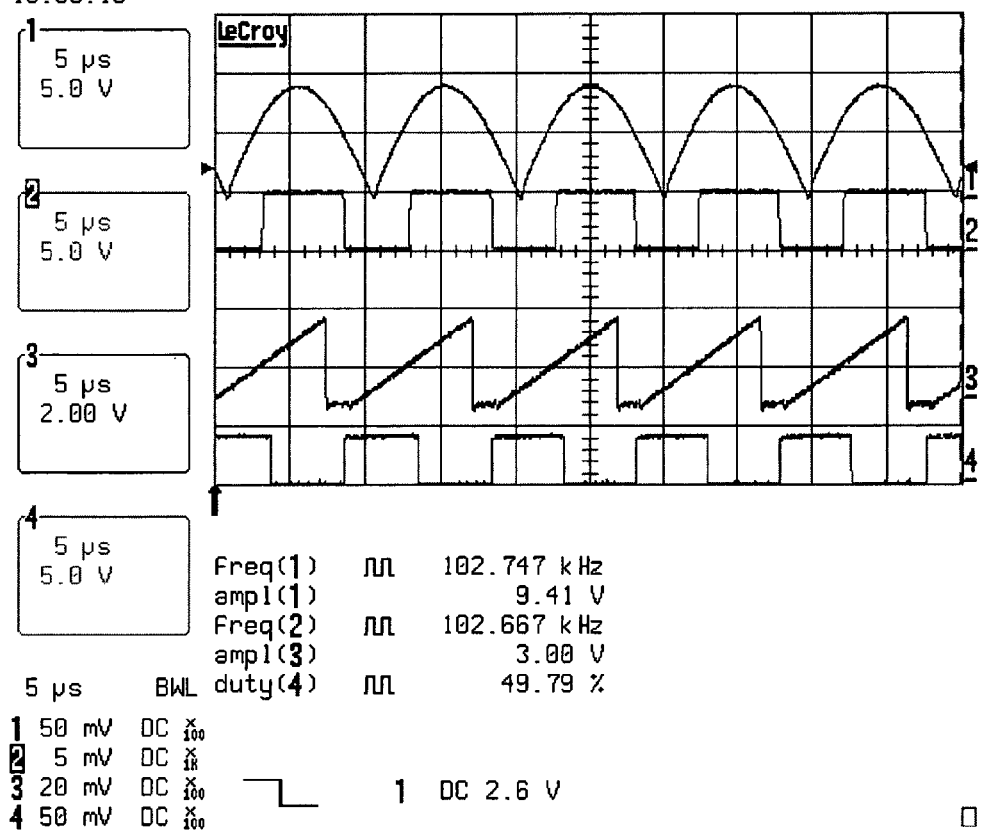
FIG. 9(c) shows the experimental waveforms of the transformer center tap voltage $V_x$, the trigger signal $V_t$, the referred sawtooth $V_s$, and the output of the DTM-PWM controller, $V_{PWM}$, with up-going error voltage regulation by $V_{e,d}$ employed, a preset threshold voltage detected at $V_x$, and a relatively lower illumination of the preferred embodiment of the DTM-PWM controller for the Royer inverter of the present invention respectively.
Figure 9:
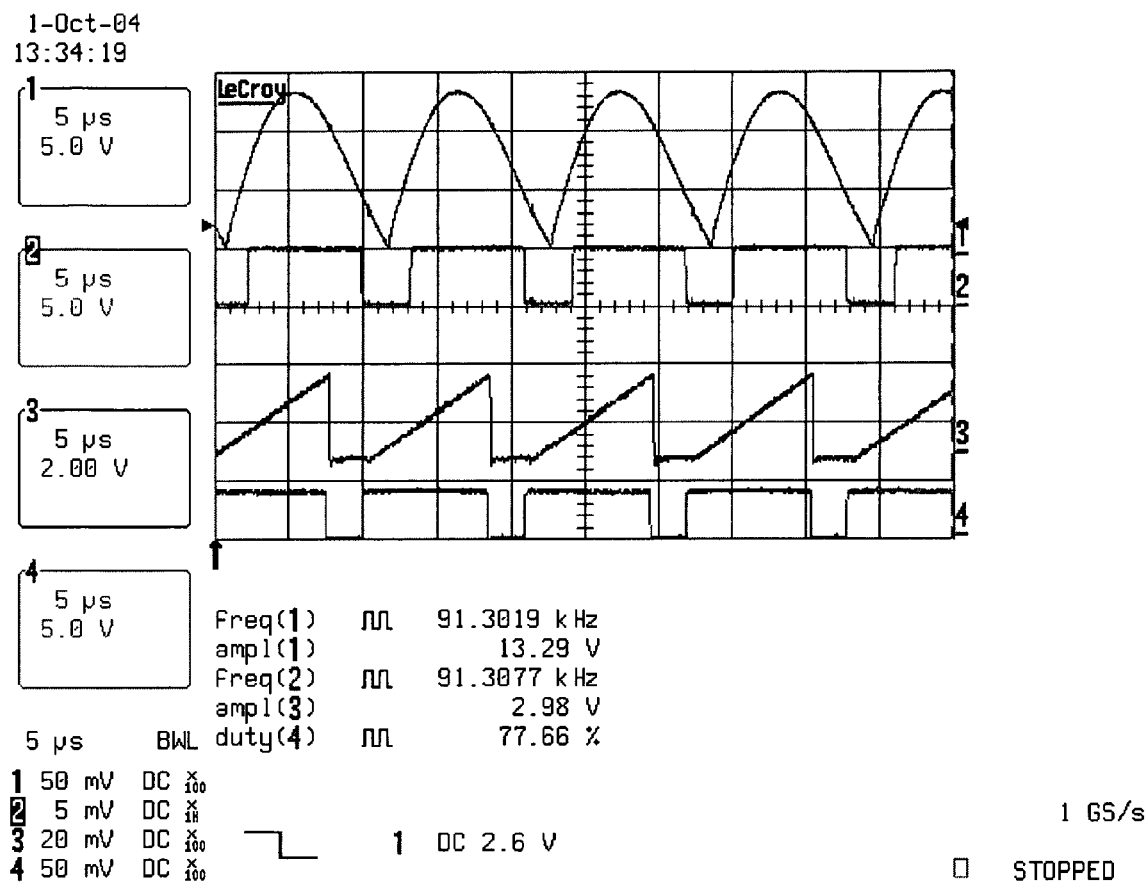
FIG. 9(d) shows the experimental waveforms of the transformer center tap voltage $V_x$, the trigger signal $V_t$, the referred sawtooth $V_s$, and the output of the DTM-PWM controller, $V_{PWM}$, with up-going error voltage regulation by $V_{e,d}$ employed, a preset threshold voltage detected at $V_x$, and a relatively higher illumination of the preferred embodiment of the DTM-PWM controller for the Royer inverter of the present invention respectively.

More experimental results are shown in FIGS. 8(a) to 8(d) and FIGS. 9(a) to 9(d). Firstly, FIG. 8(a) shows the waveforms of the transformer center tap voltage $V_x$, the trigger signal $V_t$, the referred sawtooth $V_s$, and the output of the DTM-PWM controller 22, $V_{PWM}$, with down-going error voltage regulation by $V_{e,d}$ employed, zero voltage detected at $V_{ref1}$, and a relatively lower illumination of the preferred embodiment of the DTM-PWM controller 22 (as shown in FIG. 3) for the Royer inverter 2 of the present invention respectively. Secondly, FIG. 8(b) shows the waveforms of the transformer center tap voltage $V_x$, the trigger signal $V_t$, the referred sawtooth $V_s$, and the output of the DTM-PWM controller 22, $V_{PWM}$, with down-going error voltage regulation by $V_{e,d}$ employed, zero voltage detected at $V_{ref1}$, and a relatively higher illumination of the preferred embodiment of the DTM-PWM controller 22 (as shown in FIG. 3) for the Royer inverter 2 of the present invention respectively. Thirdly, FIG. 8(c) shows the waveforms of the transformer center tap voltage $V_x$, the trigger signal $V_t$, the referred sawtooth $V_s$, and the output of the DTM-PWM controller 22, $V_{PWM}$, with down-going error voltage regulation by $V_{e,d}$ employed, a preset threshold voltage detected at $V_{refl}$, and a relatively lower illumination of the preferred embodiment of the DTM-PWM controller 22 (as shown in FIG. 3) for the Royer inverter 2 of the present invention respectively. Fourthly, FIG. 8(d) shows the waveforms of the transformer center tap voltage $V_x$, the trigger signal $V_t$, the referred sawtooth $V_s$, and the output of the DTM-PWM controller 22, $V_{PWM}$, with down-going error voltage regulation by $V_{e,d}$ employed, a preset threshold voltage detected at $V_{refl}$, and a relatively higher illumination of the preferred embodiment of the DTM-PWM controller 22 (as shown in FIG. 3) for the Royer inverter 2 of the present invention respectively. As for FIG. 9(a), it shows the waveforms of the transformer center tap voltage $V_x$, the trigger signal $V_t$, the referred sawtooth $V_s$, and the output of the DTM-PWM controller 22, $V_{PWM}$, with up-going error voltage regulation by $V_{e,d}$ employed, zero voltage detected at $V_x$, and a relatively lower illumination of the preferred embodiment of the DTM-PWM controller 22 (as shown in FIG. 3) for the Royer inverter 2 of the present invention respectively. Besides, FIG. 9(b) shows the waveforms of the transformer center tap voltage $V_x$, the trigger signal $V_t$, the referred sawtooth $V_s$, and the output of the DTM-PWM controller 22, $V_{PWM}$, with up-going error voltage regulation by $V_{e,d}$ employed, zero voltage detected at $V_x$, and a relatively higher illumination of the preferred embodiment of the DTM-PWM controller 22 (as shown in FIG. 3) for the Royer inverter 2 of the present invention respectively. Furthermore, FIG. 9(c) shows the waveforms of the transformer center tap voltage $V_x$, the trigger signal $V_t$, the referred sawtooth $V_s$, and the output of the DTM-PWM controller 22, $V_{PWM}$, with up-going error voltage regulation by $V_{e,d}$ employed, a preset threshold voltage detected at $V_x$, and a relatively lower illumination of the preferred embodiment of the DTM-PWM controller 22 (as shown in FIG. 3) for the Royer inverter 2 of the present invention respectively. Lastly, FIG. 9(d) shows the waveforms of the transformer center tap voltage $V_x$, the trigger signal $V_t$, the referred sawtooth $V_s$, and the output of the DTM-PWM controller 22, $V_{PWM}$, with $V_{e,d}$ employed for up-going error voltage regulation, a preset threshold voltage detected at $V_x$, and a relatively higher illumination of the preferred embodiment of the DTM-PWM controller 22 (as shown in FIG. 3) for the Royer inverter 2 of the present invention respectively. In FIGS. 8(a) to 9(d), Ch-1 shows the waveforms of the transformer center tap voltage $V_x$, Ch-2 shows the waveforms of the trigger signal $V_t$, Ch-3 shows the waveforms of the referred sawtooth $V_s$, and Ch-4 shows the waveforms of the output of the DTM-PWM controller, $V_{PWM}$, respectively.

In conclusion, a synchronous DTM-PWM controller is proposed to provide the energy pump-up for synchronizing the Royer inverter and for dimming the CCFLs. The proposed DTM-PWM controller 2 can synchronously process the cycle-by-cycle control in the liner regulation with respect to the resonant frequency of the Royer inverter. Descriptions and analyses of the DTM-PWM controller are clearly depicted. Two kinds of control strategies for Royer inverter regulation are clearly explored. An application to a dimmable CCFL Royer inverter with DTM-PWM controller for the proposed two control strategies is examined and experimented for comparisons. Experimental results are quite close to the theoretical analyses and predictions.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A controller for providing a dead-time-modulated (DTM) synchronous pulse width modulation (PWM) to a dimmable cold-cathode fluorescent lamp (CCFL) Royer inverter, wherein a first and a second voltages are applied to said controller to generate an output voltage to control a switch for dimming said CCFL, comprising:
   a constant current charger (CCC) for generating said first voltage;
   a first comparator for comparing said second voltage with a first reference voltage to generate a trigger signal;
   a second comparator electrically connected to said first comparator for comparing said trigger signal with a second reference voltage;
   a third comparator electrically connected to said CCC for comparing said first voltage with a third reference voltage;
   a flip-flop electrically connected to said second comparator and said third comparator for generating a control signal in response to the outputs of said second and said third comparators;
   a discharger having a first terminal for receiving said control signal, a second terminal electrically connected to said CCC, and a third terminal electrically connected to a ground;
   a fourth comparator electrically connected to said CCC for comparing an error signal with said first voltage to generate a down-going error voltage; and
   a fifth comparator electrically connected to said CCC for comparing said error signal with said first voltage to generate an up-going error voltage,
   wherein said output voltage is one of said down-going and said up-going voltages.

2. The controller according to claim 1, wherein said first voltage has a linear sawtooth waveform.

3. The controller according to claim 1, wherein said second voltage is a voltage from a center tap of a transformer.

4. The controller according to claim 3, wherein said voltage from said center tap of said transformer has a quasi-sinusoidal waveform.

5. The controller according to claim 1, wherein said output voltage is a PWM signal.

6. The controller according to claim 1, wherein said switch is a power switch of a buck converter for dimming said CCFL.

7. The controller according to claim 1, wherein said CCC is a linear charger.

8. The controller according to claim 7, wherein said linear charger comprises a current source and a capacitor.

9. The controller according to claim 8, wherein said third reference voltage is a minimum level of voltage for re-initiating a charging of said capacitor of said CCC.

10. The controller according to claim 8, wherein said first voltage generated by said CCC initiates a charging of said capacitor at each negative-going transition of said trigger signal and ceases said charging when a voltage across said capacitor is equal to said second reference voltage, and then said capacitor discharges through said discharger rapidly.

11. The controller according to claim 1, wherein said first voltage is input to a non-inverting terminal of said first comparator, and said first reference voltage is input to an inverting terminal of said first comparator.

12. The controller according to claim 11, wherein said first reference voltage is one of a zero voltage and a preset threshold voltage.

13. The controller according to claim 1, wherein said second reference voltage is input to a non-inverting terminal of said second comparator, and said trigger signal is input to an inverting terminal of said second comparator.

14. The controller according to claim 1, wherein said first voltage is input to a non-inverting terminal of said third comparator, and said third reference voltage is input to an inverting terminal of said third comparator.

15. The controller according to claim 1, wherein said flip-flop is an RS flip-flop.

16. The controller according to claim 1, wherein said discharger is a bi-polar junction transistor.

17. The controller according to claim 16, wherein said first, said second, and said third terminals are a base, a collector, and an emitter respectively.

18. The controller according to claim 1, wherein said first voltage is input to a non-inverting terminal of said fourth comparator, and said error signal is input to an inverting terminal of said fourth comparator.

19. The controller according to claim 1, wherein said error signal is input to a non-inverting terminal of said fifth comparator, and said first voltage is input to an inverting terminal of said fifth comparator.

20. The controller according to claim 1, wherein said error signal is generated from a primary-side charge-pump controller of said Royer inverter.

21. A controller for providing a DTM synchronous PWM to a dimmable CCFL Royer inverter, wherein a first and a second voltages are applied to said controller to generate an output voltage to control a switch for dimming said CCFL, comprising:
 a CCC for generating said first voltage;
 a first comparator for comparing said first voltage with a first reference voltage to generate a trigger signal;
 a second comparator electrically connected to said first comparator for comparing said trigger signal with a second reference voltage;
 a third comparator electrically connected to said CCC for comparing said first voltage with a third reference voltage;
 a flip-flop electrically connected to said second comparator and said third comparator for generating a control signal in response to the outputs of said second and said third comparators;
 a discharger having a first terminal for receiving said control signal, a second terminal electrically connected to said CCC, and a third terminal electrically connected to a ground; and
 an output circuit electrically connected to said CCC for generating said output voltage in response to an error signal and said first voltage.

22. The controller according to claim 21, wherein said output circuit comprises:
 a fourth comparator electrically connected to said CCC for comparing said error signal with said first voltage to generate a down-going error voltage; and
 a fifth comparator electrically connected to said CCC for comparing said error signal with said first voltage to generate an up-going error voltage,
wherein said output voltage is one of said down-going and said up-going voltages.

* * * * *